(12) United States Patent
Hendel et al.

(10) Patent No.: US 9,317,310 B2
(45) Date of Patent: Apr. 19, 2016

(54) SYSTEMS AND METHODS FOR HANDLING VIRTUAL MACHINE PACKETS (71) Applicant: Broadcom Corporation, Irvine, CA (US)

(72) Inventors: Ariel Hendel, Cupertino, CA (US); Karagada Ramarao Kishore, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 290 days.

(21) Appl. No.: 13/893,069

(22) Filed: May 13, 2013

(65) Prior Publication Data

US 2014/0215463 A1    Jul. 31, 2014

Related U.S. Application Data (60) Provisional application No. 61/759,318, filed on Jan. 31, 2013.

(51) Int. Cl.
*G06F 9/455* (2006.01)

(52) U.S. Cl.
CPC .. *G06F 9/45533* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 2008/0148341 A1* | 6/2008 | Ferguson et al. | 726/1 |
| 2011/0320632 A1* | 12/2011 | Karino | 709/238 |
| 2012/0027018 A1* | 2/2012 | Ilyadis | 370/392 |
| 2013/0007296 A1* | 1/2013 | Mukherjee et al. | 709/231 |
| 2013/0318255 A1* | 11/2013 | Karino | H04L 12/44 709/238 |
| 2014/0059537 A1* | 2/2014 | Kamble | G06F 9/45558 718/1 |
| 2014/0115578 A1* | 4/2014 | Cooper et al. | 718/1 |

* cited by examiner

*Primary Examiner* — Kenneth Tang
(74) *Attorney, Agent, or Firm* — McDermott Will & Emery LLP (57) ABSTRACT

Systems and methods for handling virtual machine packets are provided. In some aspects, a method includes receiving, by a network interface controller, an indicator of a packet from a virtual machine. The indicator bypasses a virtual switch coupled to the virtual machine. The method also includes determining, in response to receiving the indicator, whether the packet is designated for accelerated processing. The method also includes providing the indicator to the virtual switch for processing if the packet is determined not to be designated for accelerated processing. The method also includes processing, by the network interface controller, the packet for transmission if the packet is determined to be designated for accelerated processing.

20 Claims, 7 Drawing Sheets

SYSTEMS AND METHODS FOR HANDLING VIRTUAL MACHINE PACKETS

CROSS-REFERENCES TO RELATED APPLICATIONS

The present application claims the benefit of U.S. Provisional Patent Application Ser. No. 61/759,318, titled "Software-Defined Networking Interface," filed on Jan. 31, 2013, which is hereby incorporated by reference in its entirety for all purposes.

FIELD

The subject technology generally relates to virtual machines and, in particular, relates to systems and methods for handling virtual machine packets.

BACKGROUND

A virtual machine may be a software implementation of a physical machine and can execute programs like the physical machine. For example, virtual machines may be based on specifications of a hypothetical computer or may emulate the computer architecture and functions of the real world computer. Like a physical machine, a virtual machine may transmit and/or receive data packets over a network. As a result, an interface is needed to bridge the virtual machine and the network.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, that the subject technology may be practiced without some of these specific details. In other instances, structures and techniques have not been shown in detail so as not to obscure the subject technology.

A server may implement one or more virtual machines to provide services for various client devices. A central processing unit (CPU) of the server may include the implementation of the virtual machines and a hypervisor for managing the execution of guest operating systems running on the virtual machines. The hypervisor includes a virtual switch that manages the networking interface between the virtual machines and a physical network. In particular, the virtual switch may manage packets being sent from and/or to the virtual machines (e.g., the virtual switch may analyze the packets, modify the packets, drop the packets, return the packets to their sources, route the packets to their destinations, control the packets, etc.). However, implementation of the virtual switch by the CPU consumes power and precious CPU cycles. One approach to alleviate this processing strain on the CPU involves transmitting packets from the virtual machines directly to a network interface controller (NIC) and allowing the packets to bypass the virtual switch. However, if the virtual switch is bypassed, the ability to manage the packets may be lost.

According to various aspects of the subject technology, systems and methods are provided for managing packets sent to and/or from a virtual machine while minimizing processing performed by the CPU. In some aspects, a NIC may intercept packets from and/or to a virtual machine and manage the intercepted packets in the same or similar manner as the virtual switch would, thereby reducing the amount of processing performed by the virtual switch (and the CPU). In this regard, the NIC may provide hardware acceleration for the packets being sent from and/or to the virtual machine.

Figure 1:
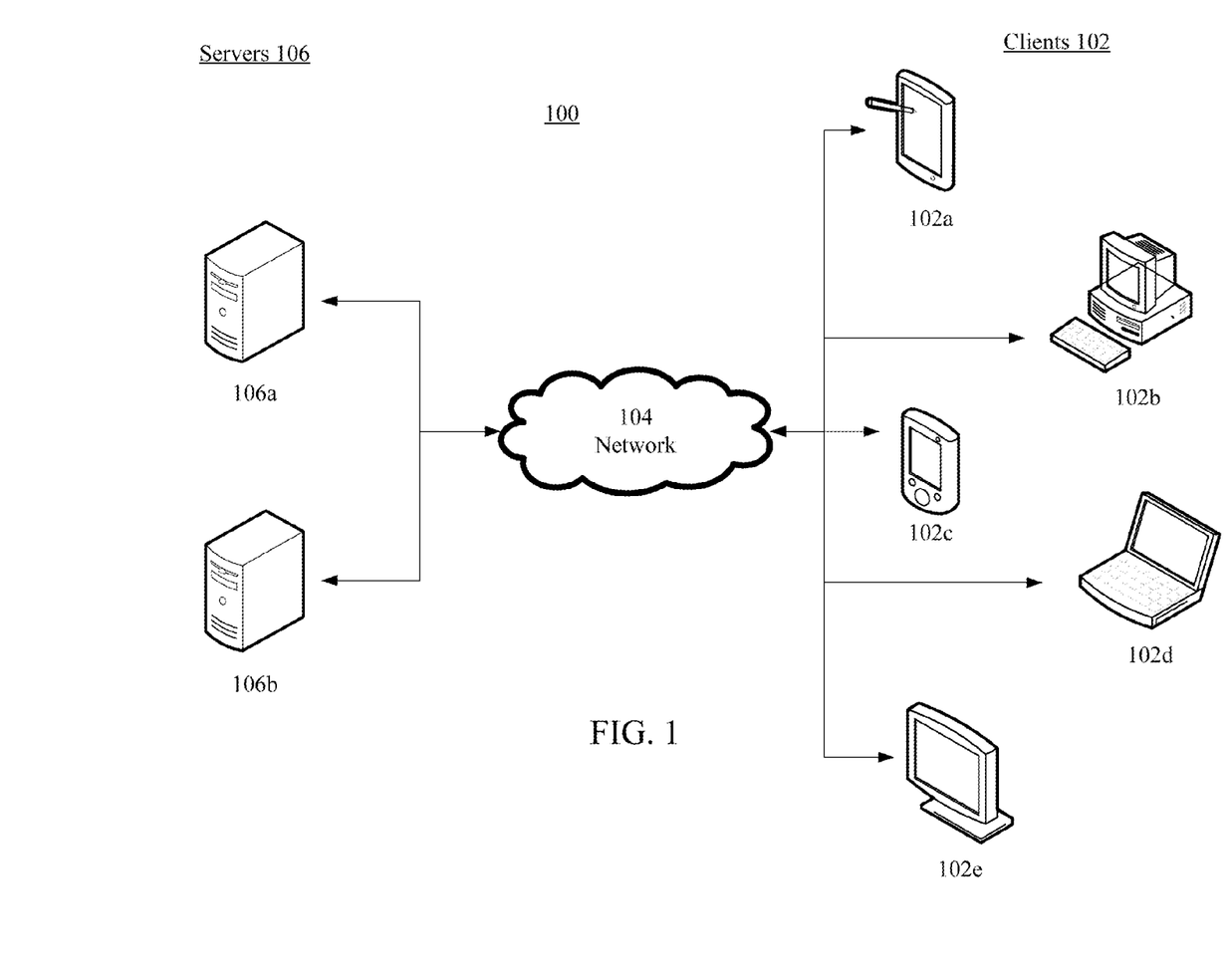
FIG. 1 illustrates an example of an environment in which servers interact with client devices over a network, in accordance with various aspects of the subject technology.

FIG. 1 illustrates an example of environment 100 in which servers 106 (e.g., servers 106a and 106b) interact with client devices 102 (e.g., client devices 102a, 102b, 102c, 102d, and 102e) over network 104, in accordance with various aspects of the subject technology. Network 104 can include, for example, any one or more of a personal area network (PAN), a local area network (LAN), a campus area network (CAN), a metropolitan area network (MAN), a wide area network (WAN), a broadband network (BBN), a peer-to-peer network, an ad-hoc network, the Internet, and the like. Further, network 104 can include, but is not limited to, any one or more network topologies such as a bus network, a star network, a ring network, a mesh network, a star-bus network, tree or hierarchical network, and the like.

Servers 106 may provide services to client devices 102 over network 104. In some aspects, each server 106 may implement one or more virtual machines that provide the services. Client devices 102, for example, can be desktop computers (e.g., client device 102b), mobile computers (e.g., client device 102d), tablet computers (e.g., including e-book readers such as client device 102a), mobile devices (e.g., smartphones or personal digital assistants such as client device 102c), set top boxes (e.g., for a television with one or more processors coupled thereto and/or embedded therein such as client device 102e), video game consoles, and/or any other electronic devices having memory, processing hardware, and/or communications capabilities.

Figure 2:
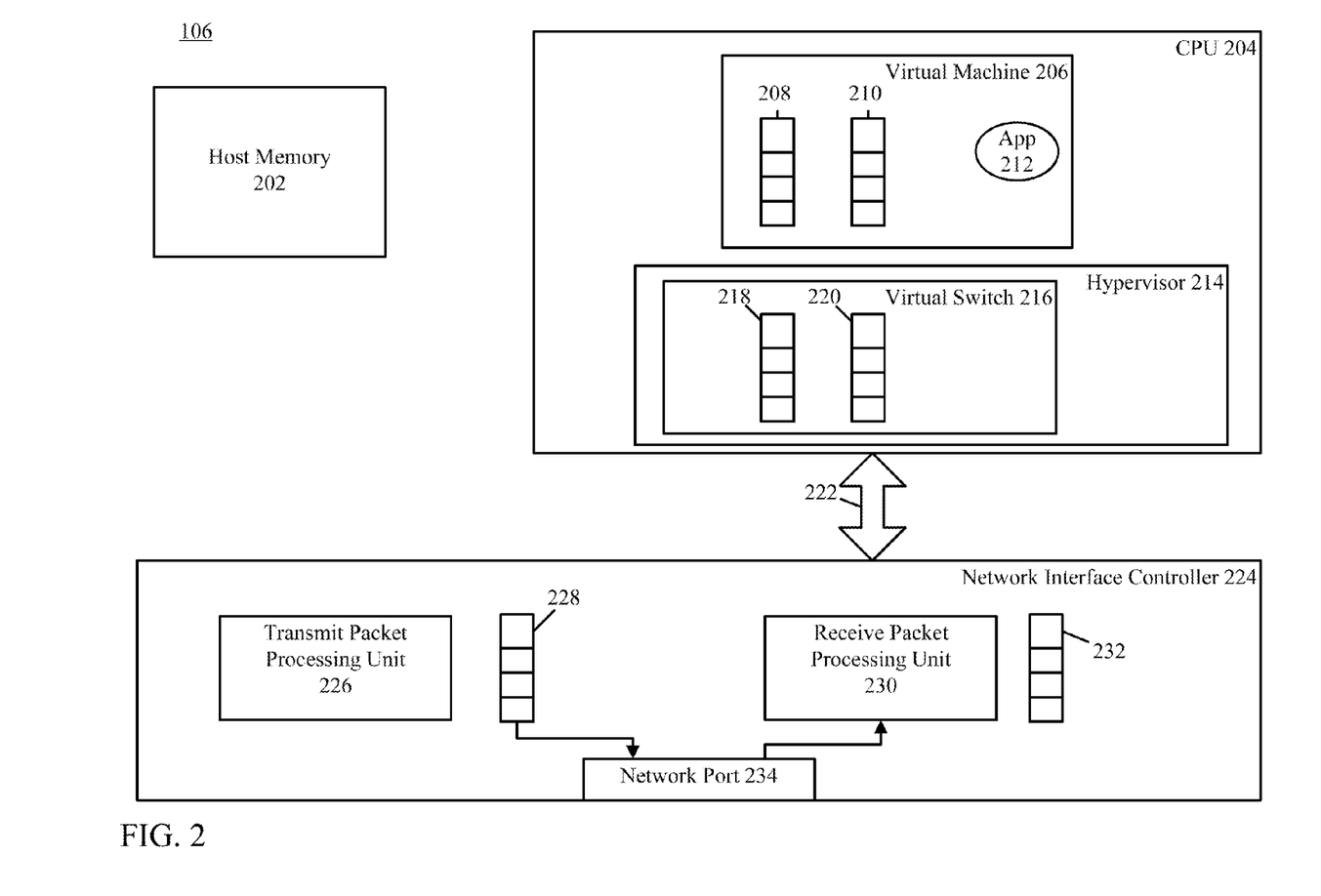
FIG. 2 is a block diagram illustrating an example of a server, in accordance with various aspects of the subject technology.

FIG. 2 is a block diagram illustrating an example of server 106, in accordance with various aspects of the subject technology. Server 106 includes host memory 202, CPU 204, and NIC 224. NIC 224 is communicatively coupled to CPU 204 via bus 222 (e.g., a peripheral component interconnect (PCI) bus, a PCI express bus, etc.). CPU 204 includes the implementation of virtual machine 206 and hypervisor 214. Virtual machine 206 includes application 212 being run on virtual machine 206, transmit queue 208 for transmitting packets, and receive queue 210 for receiving packets. Hypervisor 214 includes virtual switch 216. Virtual switch 216 may manage packets being sent from and/or to virtual machine 206, and may operate its own transmit queue 218 and receive queue 220. In one or more implementations, virtual switch 216 may route a packet from virtual machine 206 to a destination via NIC 224.

NIC 224 includes transmit packet processing unit (TPPU) 226, outbound queue 228, receive packet processing unit (RPPU) 230, inbound queue 232, and network port 234. TPPU 226 may receive outbound packets from virtual machine 206 and/or virtual switch 216 (e.g., these packets may be placed in a receive queue of TPPU 226 (not shown)). TPPU 226 may manage the received packets in the same or similar manner as virtual switch 216 (e.g., TPPU 226 may analyze the packets, modify the packets, drop the packets, return the packets to their sources, route the packets to their destinations, control the packets, etc.). In one or more implementations, if TPPU 226 determines that an outbound packet should be routed to its destination (e.g., client device 102), TPPU 226 may place this packet in outbound queue 228 (e.g., a first-in first-out queue). From there, the packet may be placed into a transmission medium (e.g., a cable, a wire, etc.) via network port 234 so that the packet may be transmitted to its destination.

RPPU 230 may receive inbound packets from the transmission medium via network port 234 (e.g., these packets may be placed in a receive queue of RPPU 230 (not shown)). RPPU 230 may also manage the received packets in the same or similar manner as virtual switch 216 (e.g., RPPU 230 may analyze the packets, modify the packets, drop the packets, return the packets to their sources, route the packets to their destinations, control the packets, etc.). In one or more implementations, if RPPU 226 determines that an inbound packet should be routed to its destination (e.g., virtual machine 206), RPPU 230 may place this packet in inbound queue 232 (e.g., a first-in first out queue). From there, the packet may be routed to its destination.

Although only one virtual machine is illustrated in FIG. 2, it is understood that CPU 204 can implement any number of virtual machines. In such a case, virtual switch 216 may operate separate transmit and receive queues for each additional virtual machine. Furthermore, TPPU 226 may operate a separate receive queue for each additional virtual machine. In one or more implementations, NIC 224 may include a separate inbound queue for each additional virtual machine.

Figure 3:
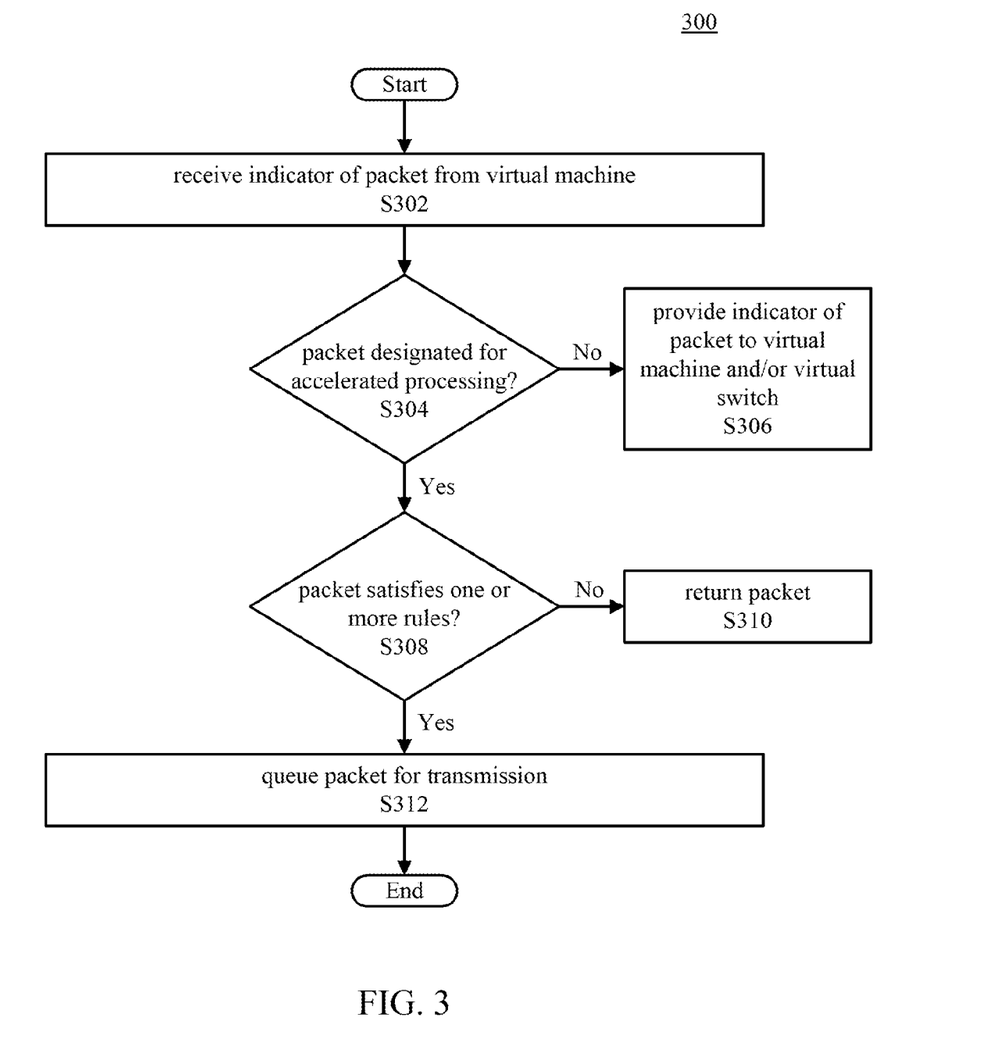
FIG. 3 illustrates an example of a method for handling virtual machine packets, in accordance with various aspects of the subject technology.

FIG. 3 illustrates an example of method 300 for handling virtual machine packets, in accordance with various aspects of the subject technology. In particular, method 300 may be implemented when a virtual machine provides a packet for transmission. Method 300 is described herein with reference to FIG. 4, which is the block diagram of FIG. 2 but further illustrates examples of the flow of the packet for transmission, in accordance with various aspects of the subject technology. Although method 300 is described herein with reference to the examples in FIG. 4, method 300 is not limited to these examples. Furthermore, although method 300 is illustrated in the order shown in FIG. 3, it is understood that method 300 may be implemented in a different order.

Figure 4:
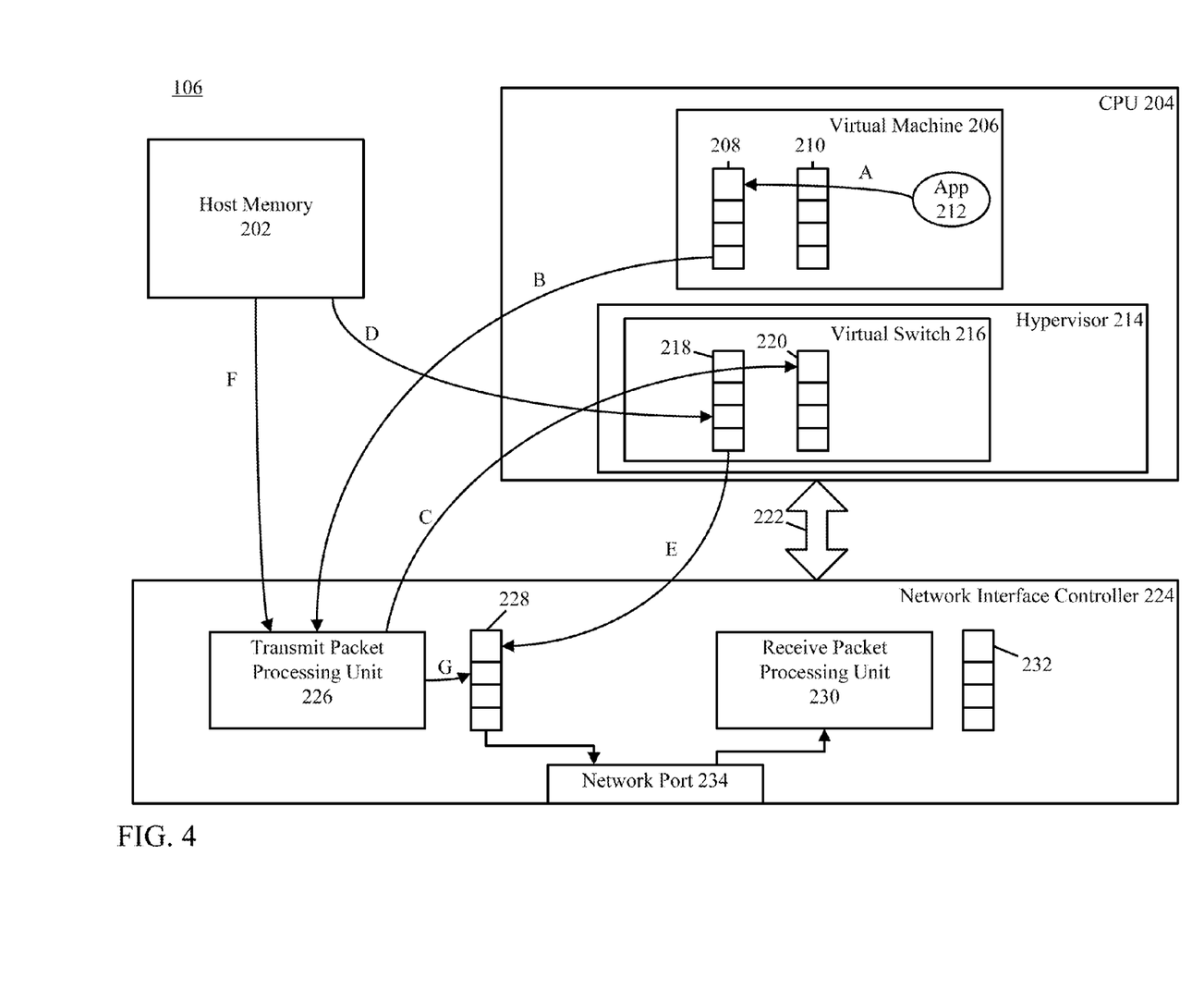
FIG. 4 is the block diagram of FIG. 2 but further illustrates examples of the flow of a packet for transmission, in accordance with various aspects of the subject technology.

According to certain aspects, TPPU 226 receives an indicator of a packet from virtual machine 206 (S302). In one or more implementations, the indicator of the packet may be a header of the packet, a payload of the packet, a memory address of the packet, and/or other information for identifying the packet. In some aspects, the indicator bypasses virtual switch 216 (e.g., the indicator is received by TPPU 226 without passing through virtual switch 216). In one or more implementations, application 212 running on virtual machine 206 may generate a packet to be transmitted to client device 102. Application 212 may place the indicator of this packet in transmit queue 208, as illustrated by arrow A. TPPU 226 may receive this indicator directly from transmit queue 208, as illustrated by arrow B.

In some aspects, TPPU 226 determines whether the packet is designated for accelerated processing (S304). A packet designated for accelerated processing may be a packet having high-priority (e.g., it may be part of a video and/or audio stream), a packet that is being sent when CPU 204 does not have enough processing resources to manage the packet (e.g., by virtual switch 216), and/or a packet that is otherwise intended to be managed by NIC 224 instead of virtual switch 216. According to one or more implementations, TPPU 226 may determine whether the packet is designated for accelerated processing by using a flow table that has entries indicating which packets may be designated for accelerated processing. The flow table, for example, may be stored in memory (e.g., host memory 202 and/or elsewhere, such as in NIC 224). TPPU 226 may compare the indicator to an entry in the flow table, and if the indicator matches the entry, TPPU 226 may determine that the packet is designated for accelerated processing. If not, TPPU 226 may determine that the packet is not designated for accelerated processing.

According to certain aspects, TPPU 226 provides the indicator to virtual machine 206 and/or virtual switch 216 if the packet is determined not to be designated for accelerated processing (S306). Thus, the packet may be managed by virtual switch 216 in its normal, non-accelerated manner. In one or more implementations, TPPU 226 may provide the indicator to virtual switch 216 by placing the indicator in receive queue 220, as illustrated by arrow C. Virtual switch 216 may then retrieve the packet from host memory 202 and place it in transmit queue 218, as illustrated by arrow D. For example, if the indicator of the packet is just the header of the packet, virtual switch 216 may retrieve the payload of the packet from host memory 202.

Virtual switch 216 may perform other actions to manage the packet, such as by determining whether the packet satisfies one or more rules to allow the packet to be transmitted, whether the packet needs to be modified, etc. In one or more implementations, virtual switch 216 may determine whether the packet satisfies one or more rules by using an access table (e.g., an access control list table) that has entries indicating the one or more rules that need to be satisfied in order to allow the packet to be transmitted. The access table, for example, may be stored in memory (e.g., host memory 202, cache residing on CPU 204, etc.). Virtual switch 216 may compare the packet to an entry in the access table, and if the packet matches the entry (e.g., the packet satisfies the rule indicated by the particular entry), virtual switch 216 may determine that the packet satisfies the one or more rules and is ready to be transmitted. If not, virtual switch 216 may drop the packet, modify the packet, and/or return the packet to virtual machine 206. If virtual switch 216 determines that the packet is ready to be transmitted, virtual switch 216 may place the packet in outbound queue 228 of NIC 224, as illustrated by arrow E. The packet may then be placed into the transmission medium via network port 234 so that the packet may be transmitted to its destination (e.g., client device 102).

Although FIG. 4 illustrates TPPU 226 providing the indicator to virtual switch 216 via arrow C, it is understood that TPPU 226 may alternatively provide the indicator to virtual machine 206. For example, TPPU 226 may place the indicator in transmit queue 208 of virtual machine 206. According to one or more implementations, virtual switch 216 may then receive the indicator from transmit queue 208 of virtual machine 206. As discussed above, the indicator may include the header of the packet and/or the payload of the packet. According to certain aspects, if the indicator includes both the header and the payload, TPPU 226 may discard the payload and provide just the header to virtual machine 206 and/or virtual switch 216.

According to certain aspects, TPPU 226 determines whether the packet satisfies one or more rules if the packet is determined to be designated for accelerated processing (S308). Thus, TPPU 226 may perform the same or similar function as virtual switch 216 to determine whether the packet is allowed to be transmitted. Since TPPU 226 is performing this function, CPU 204 does not have to spend resources in managing the packet for transmission. Thus, CPU 204 can be freed to perform other functions instead (e.g., providing services to client devices 102).

In some aspects, TPPU 226 may utilize the same or similar access table as the one used by virtual switch 216. In some aspects, the access table utilized by TPPU 226 may be stored in memory (e.g., host memory 202 and/or elsewhere, such as in NIC 224). According to certain aspects, the one or more rules may be based on any policy control, such as overlay control (e.g., allowing encapsulated or un-encapsulated packets to be transmitted), access control (e.g., allowing communications from certain applications and/or virtual machines to be transmitted, allowing communications that are encrypted or un-encrypted to be transmitted, etc.), flow control (e.g., allowing packets from the same activity to be transmitted, allowing packets in a certain direction to be transmitted, etc.), network address translation control (e.g., allowing packets with certain translated internet protocol addresses to be transmitted), and mirror control (e.g., allowing packets of mirroring data to be transmitted). Certain entries in the access table may be rarely used. Thus, in accordance with certain aspects, TPPU 226 may determine usage statistics of each entry in the access table so that the access table may be periodically updated (e.g., modifying or deleting an entry in the access table if that entry is rarely used).

According to certain aspects, TPPU 226 returns the packet to its source (e.g., virtual machine 206) if the packet is determined not to satisfy the one or more rules (S310). In one or more implementations, TPPU 226 may place the packet in receive queue 210 of virtual machine 206, which may indicate to virtual machine 206 that the packet could not be transmitted. Although the packet is described as being returned to virtual machine 206, the packet may also be dropped by TPPU 226 or modified by TPPU 226 so that the packet may satisfy the one or more rules.

According to certain aspects, TPPU 226 queues the packet for transmission if the packet is determined to satisfy the one or more rules (S312). In one or more implementations, if the indicator previously received by TPPU 226 is just the header of the packet, TPPU 226 may retrieve the payload of the packet from host memory 202, as illustrated by arrow F. TPPU 226 may then place the packet (e.g., both the header and the payload) into outbound queue 228, as illustrated by arrow G. From there, the packet may be placed into the transmission medium via network port 234 so that the packet may be transmitted to its destination (e.g., client device 102).

According to certain aspects, it may be desirable to retrieve the payload of the packet at a target transmission rate based on how much bandwidth is available at the transmission medium. In one or more implementations, TPPU 226 may monitor congestion in the transmission medium, and may determine the target transmission rate based on the congestion. For example, if the transmission medium is not congested, TPPU 226 may determine that the target transmission rate can be high (e.g., 10 gigabits per second). In this regard, TPPU 226 may retrieve the payload at the determined target transmission rate.

Figure 5:
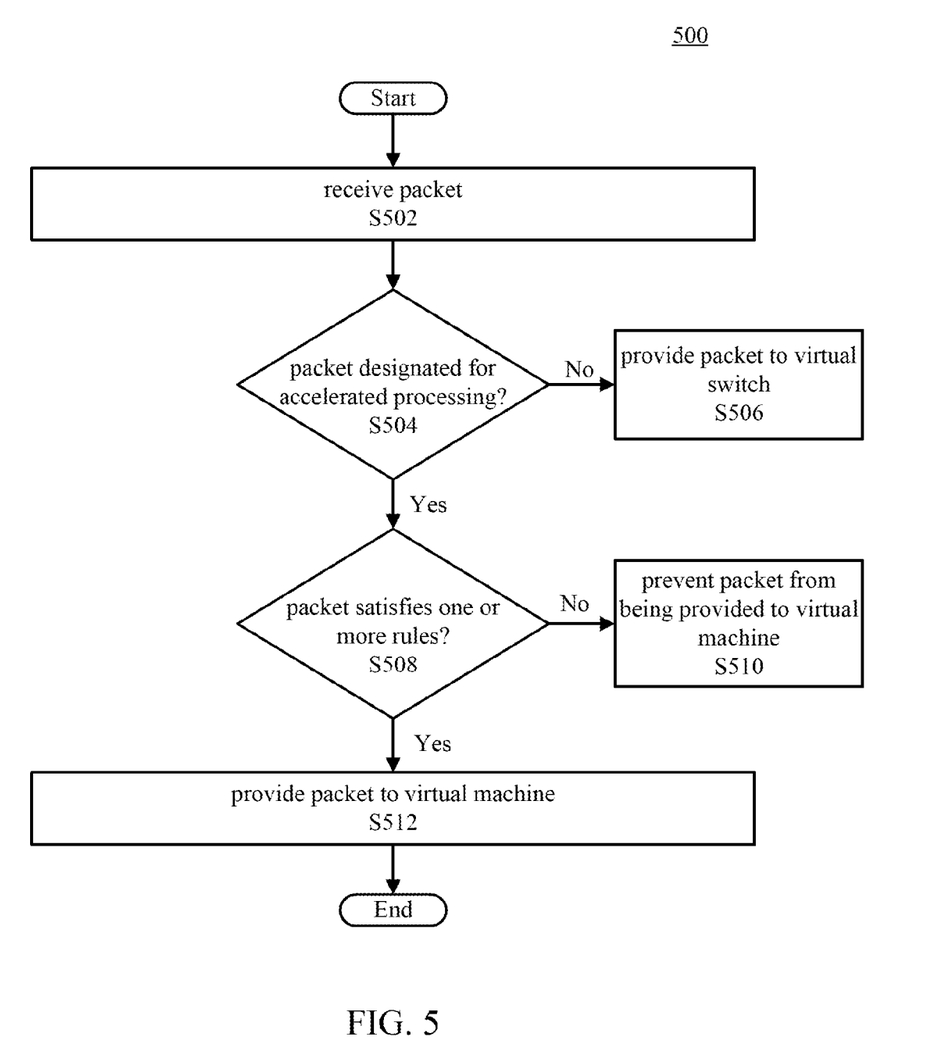
FIG. 5 illustrates an example of a method for handling virtual machine packets, in accordance with various aspects of the subject technology.

FIG. 5 illustrates an example of method 500 for handling virtual machine packets, in accordance with various aspects of the subject technology. In particular, method 500 may be implemented when a virtual machine receives a packet. Method 500 is described herein with reference to FIG. 6, which is the block diagram of FIG. 2 but further illustrates examples of the flow of the receipt of the packet, in accordance with various aspects of the subject technology. Although method 500 is described herein with reference to the examples in FIG. 6, method 500 is not limited to these examples. Furthermore, although method 500 is illustrated in the order shown in FIG. 5, it is understood that method 500 may be implemented in a different order.

Figure 6:
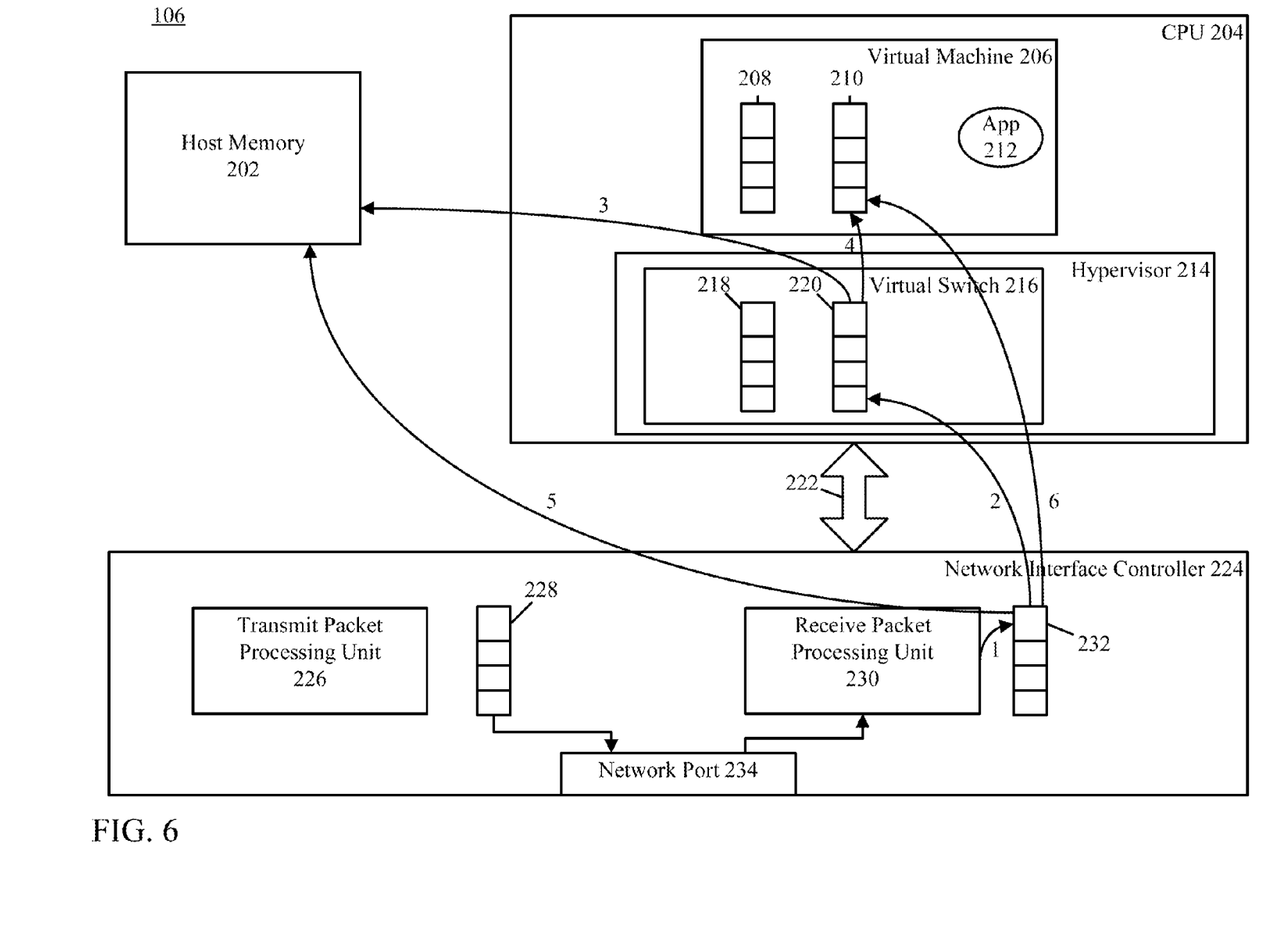
FIG. 6 is the block diagram of FIG. 2 but further illustrates examples of the flow of the receipt of a packet, in accordance with various aspects of the subject technology.

According to certain aspects, RPPU 230 receives a packet (e.g., an inbound packet from the transmission medium via network port 234) (S502). This packet, for example, may be from client device 102 and may have virtual machine 206 as its intended destination. In one or more implementations, RPPU 230 may determine the intended destination of the packet. Furthermore, in a similar manner as TPPU 226 in S304, RPPU 230 determines whether the packet is designated for accelerated processing (S504).

According to certain aspects, RPPU 230 provides the packet to virtual switch 216 if the packet is determined not to be designated for accelerated processing (S506). Thus, the packet may be managed by virtual switch 216 in its normal, non-accelerated manner. In one or more implementations, RPPU 230 may provide the packet to virtual switch 216 by placing the packet in inbound queue 232, as illustrated by arrow 1. Virtual switch 216 may receive the packet from inbound queue 232, and the packet may be placed in receive queue 220 of virtual switch 216, as illustrated by arrow 2.

Virtual switch 216 may perform other actions to manage the packet, such as by determining whether the packet satisfies one or more rules to allow the packet to be transmitted to its intended destination (e.g., virtual machine 206), whether the packet needs to be modified, etc. In one or more implementations, virtual switch 216 may determine whether the packet satisfies one or more rules by using an access table in a similar manner as when virtual switch 216 manages packets being sent from virtual machine 206. If virtual switch 216 determines that the inbound packet does not satisfy the one or more rules, virtual switch 216 may drop the packet, modify the packet, and/or return the packet to its source (e.g., client device 102). If virtual switch 216 determines that the inbound packet satisfies the one or more rules, virtual switch 216 may place the packet in host memory 202, as illustrated by arrow 3. Virtual switch 216 may also provide virtual machine 206 with a notification that virtual machine 206 has an inbound packet from client device 102. In one or more implementations, virtual switch 216 may place the packet in receive queue 210 of virtual machine 206, as illustrated by arrow 4.

According to certain aspects, RPPU 230 determines whether the packet satisfies one or more rules if the packet is determined to be designated for accelerated processing (S508). Thus, RPPU 230 may perform the same or similar function as virtual switch 216 to determine whether the packet is allowed to be transmitted to its intended destination (e.g., virtual machine 206). Since RPPU 230 is performing this function, CPU 204 does not have to spend resources in managing the packet for receipt. Thus, CPU 204 can be freed to perform other functions instead (e.g., providing services to client devices 102). In some aspects, RPPU 230 may utilize the same or similar access table as the one used by virtual switch 216. In some aspects, the access table utilized by RPPU 230 may be stored in memory (e.g., host memory 202 and/or elsewhere, such as in NIC 224).

According to certain aspects, RPPU 230 prevents the packet from being provided to virtual machine 206 if the packet is determined not to satisfy the one or more rules (S510). In one or more implementations, the packet may be dropped by RPPU 230 or modified by RPPU 230 so that the packet may satisfy the one or more rules. In some aspects, RPPU 230 may place the packet in receive queue 220 of virtual switch 216, thereby allowing virtual switch 216 to process the packet (e.g., virtual switch 216 can drop or modify the packet).

According to certain aspects, RPPU 230 provides the packet to virtual machine 206 if the packet is determined to satisfy the one or more rules (S512). When the packet is being provided to virtual machine 206, the packet may bypass virtual switch 216. In one or more implementations, RPPU 230 places the packet in inbound queue 232, as illustrated by arrow 1. The packet may then be placed in host memory 202, as illustrated by arrow 5. RPPU 230 may also provide virtual machine 206 with a notification that virtual machine 206 has an inbound packet from client device 102. In one or more implementations, RPPU 230 may place the packet in receive queue 210 of virtual machine 206, as illustrated by arrow 6.

Figure 7:
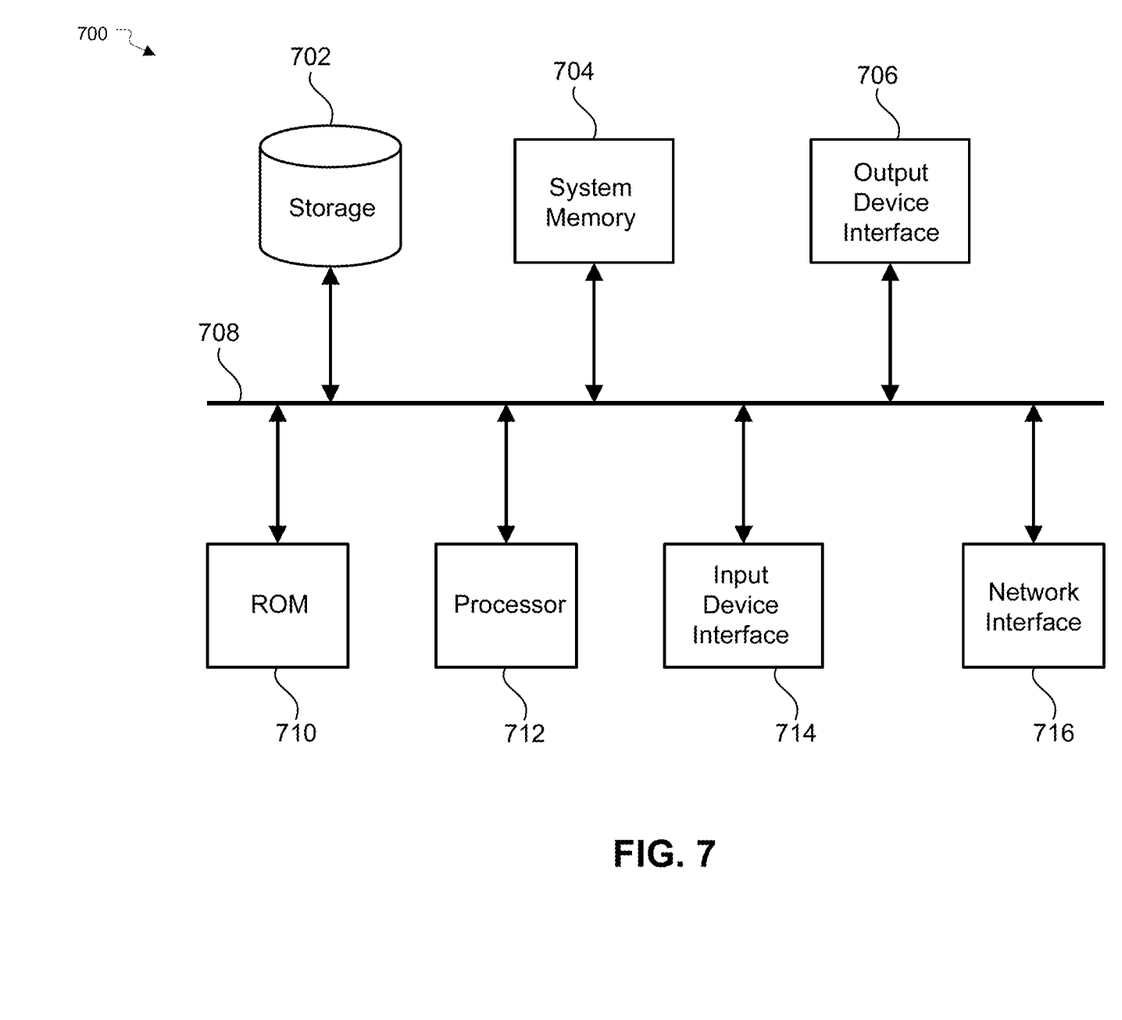
FIG. 7 conceptually illustrates an electronic system with which aspects of the subject technology may be implemented.

FIG. 7 conceptually illustrates electronic system 700 with which aspects of the subject technology may be implemented. Electronic system 700, for example, can be a computer, a server, a switch, a router, a base station, a receiver, a NIC, any device that handles virtual machine packets, or generally any electronic device that transmits signals over a network. Such an electronic system includes various types of computer readable media and interfaces for various other types of computer readable media. Electronic system 700 includes bus 708, processing unit(s) 712, system memory 704, read-only memory (ROM) 710, permanent storage device 702, input device interface 714, output device interface 706, and network interface 716, or subsets and variations thereof.

Bus 708 collectively represents all system, peripheral, and chipset buses that communicatively connect the numerous internal devices of electronic system 700. In one or more implementations, bus 708 communicatively connects processing unit(s) 712 with ROM 710, system memory 704, and permanent storage device 702. From these various memory units, processing unit(s) 712 retrieves instructions to execute and data to process in order to execute the processes of the subject disclosure. In one or more implementations, the processes to be executed may include method 300 and method 500. The processing unit(s) can be a single processor or a multi-core processor in different implementations.

ROM 710 stores static data and instructions that are needed by processing unit(s) 712 and other modules of the electronic system. Permanent storage device 702, on the other hand is a read-and-write memory device. This device is a non-volatile memory unit that stores instructions and data even when electronic system 700 is off One or more implementations of the subject disclosure use a mass-storage device (such as a magnetic or optical disk and its corresponding disk drive) as permanent storage device 702.

Other implementations use a removable storage device (such as a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such as random access memory. System memory 704 stores any of the instructions and data that processing unit(s) 712 needs at runtime. In one or more implementations, the processes of the subject disclosure are stored in system memory 704, permanent storage device 702, and/or ROM 710. From these various memory units, processing unit(s) 712 retrieves instructions to execute and data to process in order to execute the processes of one or more implementations. According to certain aspects, any one of storage device 702, system memory 704, and ROM 710 may be used to store the flow table, the access table, the indicator of the packet, and/or other information for executing method 300 and/or method 500.

In some aspects, bus 708 also connects to input and output device interfaces 714 and 706. Input device interface 714 enables a user to communicate information and select commands to the electronic system. Input devices used with input device interface 714 include, for example, alphanumeric keyboards and pointing devices (also called "cursor control devices"). Output device interface 706 enables, for example, the display of images generated by electronic system 700. Output devices used with output device interface 706 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, bus 708 also couples electronic system 700 to a network (not shown) through network interface 716. In this manner, the computer can be a part of a network of computers (such as a local area network ("LAN"), a wide area network ("WAN"), or an Intranet, or a network of networks, such as the Internet. Any or all components of electronic system 700 can be used in conjunction with the subject disclosure.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to analyze and control an operation or a component may also mean the processor being programmed to analyze and control the operation or the processor being operable to analyze and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for handling virtual machine packets, the method comprising:
    receiving, by a network interface controller, indicators of packets from a virtual machine, wherein the indicators bypass a virtual switch coupled to the virtual machine;
    determining, in response to receiving each of the indicators and based at least in part on an amount of processing resources available for managing each of the packets by the virtual switch, whether each of the packets is designated for accelerated processing;

providing, via the virtual machine, one of indicators to the virtual switch for processing for one of the packets that is determined not to be designated for accelerated processing; and processing, by the network interface controller and bypassing the virtual switch, another of the packets for transmission, wherein the another of the packets is determined to be designated for accelerated processing.

2. The method of claim 1, wherein the one of the indicators comprises at least one of a header of the one of the packets, a payload of the one of the packets, and a memory address of the one of the packets.

3. The method of claim 1, wherein a central processing unit implements the virtual machine and the virtual switch, wherein the virtual switch is configured to route the one of the packets from the virtual machine to a destination of the one of the packets, and wherein the network interface controller is coupled to the central processing unit.

4. The method of claim 1, wherein determining whether each of the packets is designated for accelerated processing comprises comparing each of the indicators of each of the packets to an entry in a flow table, and wherein each of the respective packets is determined to be eligible for accelerated processing if the respective indicator of the respective packet matches the entry in the flow table.

5. The method of claim 1, wherein providing, via the virtual machine, the one of the indicators to the virtual switch comprises providing the one of the indicators to the virtual machine, and wherein the virtual machine is configured to provide the indicator to the virtual switch.

6. The method of claim 1, wherein the one of the indicators comprises a header of the one of the packets and a payload of the one of the packets, and wherein providing the one of the indicators to the virtual switch comprises:

discarding the payload; and providing the header to the virtual switch.

7. The method of claim 1, wherein processing the another of the packets for transmission comprises queuing the another of the packets for transmission at the network interface controller.

8. The method of claim 1, wherein processing the another of the packets for transmission comprises determining whether the another of the packets satisfies one or more rules.

9. The method of claim 8, wherein determining whether the another of the packets satisfies one or more rules comprises comparing the another of the packets to an entry in an access table, and wherein the another of the packets is determined to satisfy the one or more rules if the another of the packets matches the entry in the access table.

10. The method of claim 9, further comprising:

determining usage statistics of the entry in the access table; and updating the entry based on the usage statistics.

11. The method of claim 8, wherein processing the another of the packets for transmission further comprises queuing the another of the packets for transmission when the another of the packets is determined to satisfy the one or more rules.

12. The method of claim 11, wherein another of the indicators comprises a header of the another of the packets, and wherein queuing the another of the packets for transmission comprises retrieving a payload of the another of the packets from memory.

13. The method of claim 8, wherein the one or more rules are based on at least one of network address translation, overlay control, access control, flow control, and mirror control.

14. A system for handling virtual machine packets, the system comprising:

a memory comprising instructions for handing virtual machine packets; and a processor configured to execute the instructions to:

receive a first header of a first packet and a second header of a second packet;

determine, in response to receiving each of the first and second headers and based at least in part on whether the first and second headers are associated with an audio stream or a video stream, whether each of the first and second packets is designated for accelerated processing;

provide the first header to a virtual switch for processing when the first packet is determined not to be designated for accelerated processing, the virtual switch being coupled to the system; and process the second packet, bypassing the virtual switch, when the second packet is determined to be designated for accelerated processing.

15. The system of claim 14, wherein the first and second headers are received from a virtual machine coupled to the virtual switch, and wherein the first and second headers bypass the virtual switch.

16. The system of claim 15, wherein the second packet is processed for transmission, and wherein processing the second packet for transmission comprises:

determining a target transmission rate; and retrieving a payload of the second packet from memory at the target transmission rate.

17. The system of claim 14, wherein a destination of the second packet is a virtual machine coupled to the virtual switch, wherein the second packet is processed for transmission to the virtual machine.

18. A computer program product comprising instructions stored in a non-transitory computer-readable storage medium, the instructions comprising:

instructions to receive, by a network interface controller, indicators of packets from a virtual machine, wherein the indicators bypass a virtual switch coupled to the virtual machine;

instructions to determine, in response to receiving each of the indicators and based at least in part on an amount of processing resources available for managing each of the packets by the virtual switch, whether each of the packets is designated for accelerated processing;

instructions to provide, via the virtual machine, one of indicators to the virtual switch for processing for one of the packets that is determined not to be designated for accelerated processing; and instructions to process, by the network interface controller and bypassing the virtual switch, another of the packets for transmission, wherein the another of the packets is determined to be designated for accelerated processing.

19. The computer program product of claim 18, wherein the one of the indicators comprises at least one of a header of the one of the packets, a payload of the one of the packets, and a memory address of the one of the packets.

20. The computer program product of claim 18, wherein the instructions to determine whether each of the packets is designated for accelerated processing comprises instructions to compare each of the indicators of each of the packets to an entry in a flow table, and wherein each of the respective packets is determined to be eligible for accelerated processing if the respective indicator of the respective packet matches the entry in the flow table.

* * * * *